Dec. 6, 1966
W. R. WRIGHT ETAL
3,290,120
APPARATUS FOR THE PRODUCTION OF CARBON BLACK
Filed March 2, 1964
4 Sheets-Sheet 1
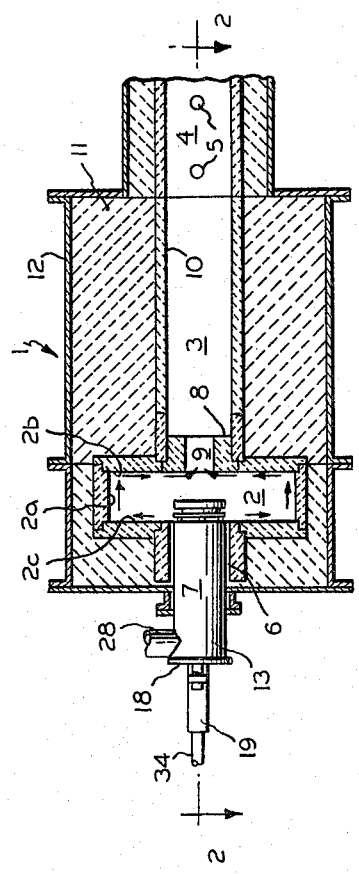
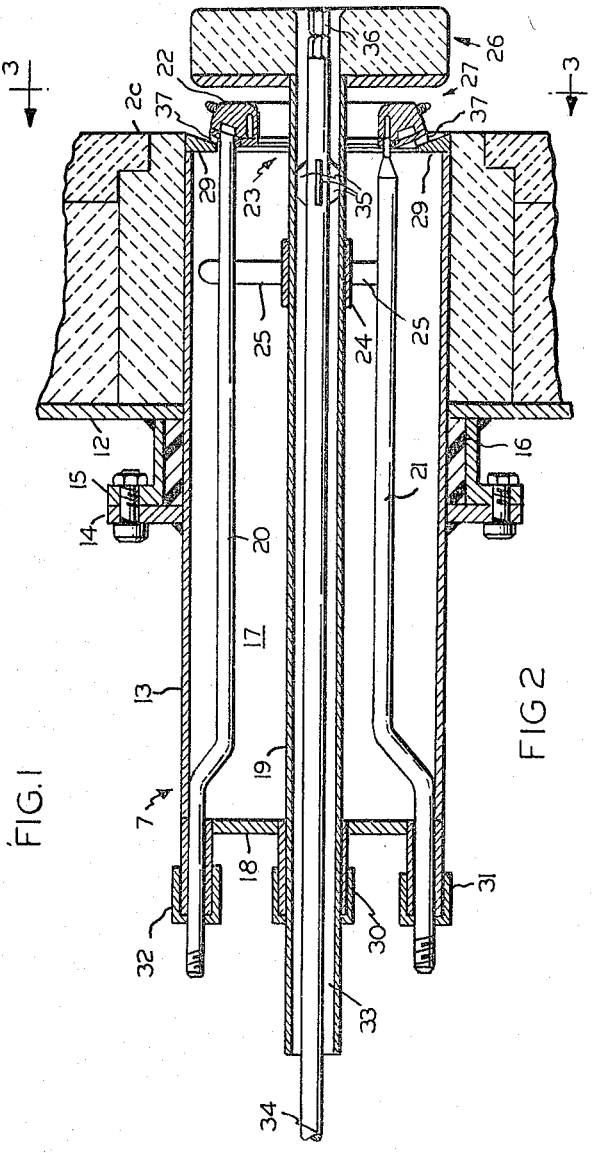
INVENTORS
WILLIAM R. WRIGHT
TRAVIS S. WHITSEL
DAVID C. WILLIAMS
JOHN A. GENTRY
BY *Walter H. Schneider*
ATTORNEY INVENTORS
WILLIAM R. WRIGHT
TRAVIS S. WHITSEL
DAVID C. WILLIAMS
JOHN A. GENTRY
BY Walter H. Schneider
ATTORNEY

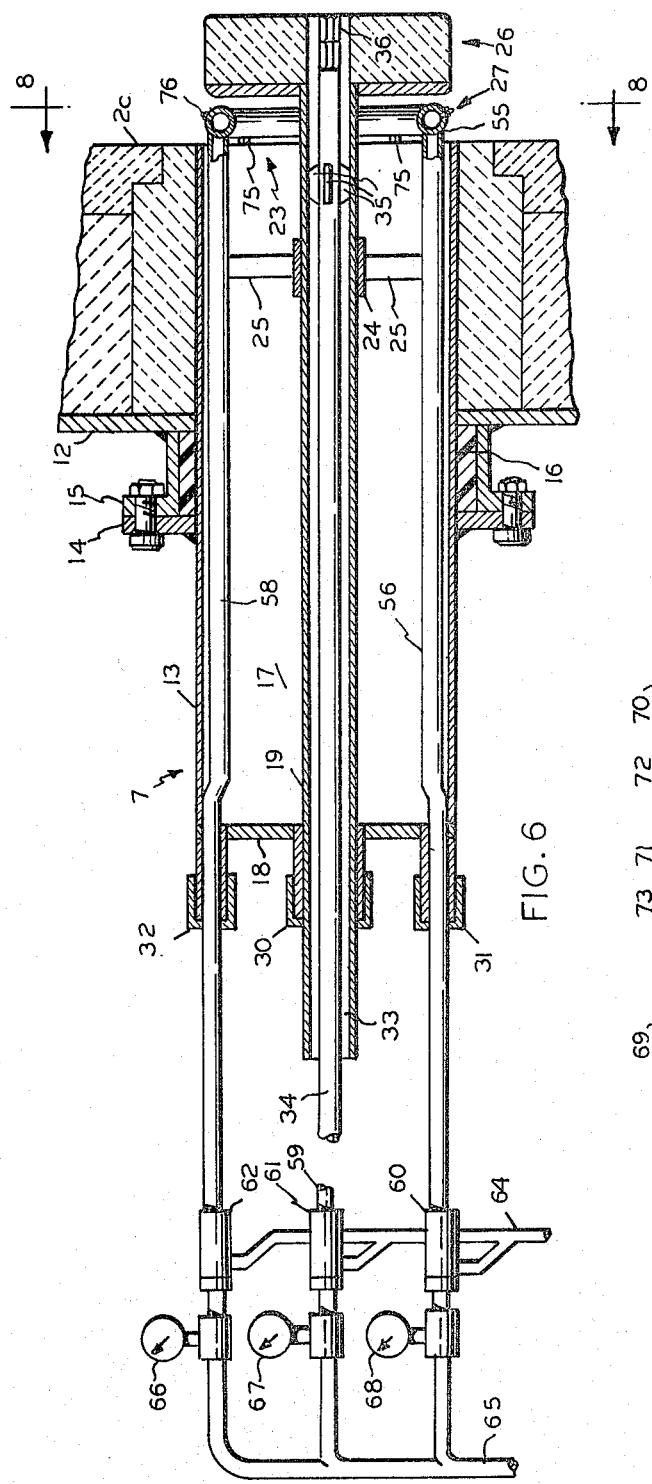
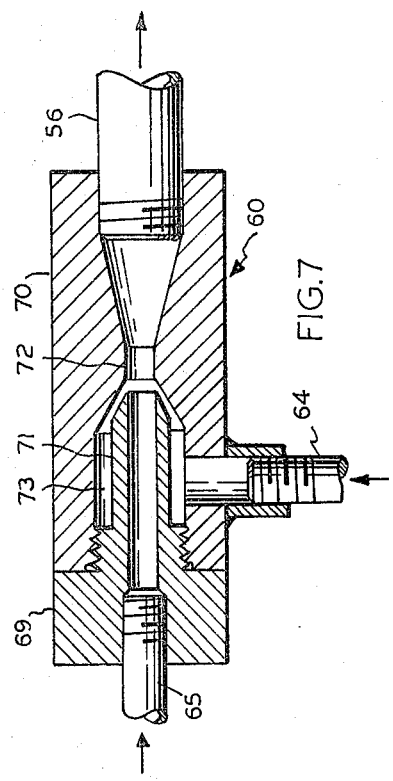

INVENTORS
WILLIAM R. WRIGHT
TRAVIS S. WHITSEL
DAVID C. WILLIAMS
JOHN A. GENTRY

BY *Walter H. Schneider*
ATTORNEY

United States Patent Office 3,290,120
Patented Dec. 6, 1966

3,290,120
APPARATUS FOR THE PRODUCTION OF
CARBON BLACK
William R. Wright, Rockport, and Travis S. Whitsel and David C. Williams, Houston, and John A. Gentry, Aransas Pass, Tex., assignors to Ashland Oil & Refining Company, Houston, Tex., a corporation of Kentucky
Filed Mar. 2, 1964, Ser. No. 348,429
18 Claims. (Cl. 23—259.5)

This application is a continuation-in-part of U.S. patent application Ser. No. 267,499, filed March 25, 1963, and now abandoned.

This invention relates to the art of producing carbon black. More particularly, it relates to apparatus for producing carbon black through decomposition of a hydrocarbon feedstock by contacting it with a burning mixture of fuel and combustion-supporting gas.

The preparation of carbon black from gaseous and liquid hydrocarbon feedstocks is well known. The carbon black-producing reaction is generally carried out by injecting a hydrocarbon feedstock, a hydrocarbon fuel and a combustion supporting gas containing a limited supply of oxygen into a carbon black reactor. Combustion of the hydrocarbon fuel within the reactor supplies the heat required to pyrolyze or dissociate the hydrocarbon feedstock, yielding various products, including carbon black, which leaves the reactor in the form of particles suspended in an intensely hot effluent gas stream.

This invention pertains to various well known types of carbon black reactors which have as their common characteristics a generally tubular combustion chamber with feedstock and fuel injection means and a generally annular combustion-supporting gas inlet situated at one end of the chamber. A "generally annular" combustion supporting gas inlet is a ring-shaped opening, which may project the combustion-supporting gas in a direction generally parallel to the axis of the combustion chamber, or at an angle thereto. The combustion chamber diameter may vary or remain uniform throughout its length, and the chamber may include zones or sub-chambers of similar or different shape and dimensions. Any effective type of cooling and collection equipment which is able to satisfactorily withstand the effects of the hot effluent gases is associated with the aforesaid chamber or chambers. One such reactor is disclosed in United States Letters Patent 3,060,003, issued October 23, 1962.

Relatively little difficulty is encountered in firing the above types of reactors with natural gas. However, in some geographical areas, it is desirable or necessary to use other fuels, due to the high cost or practical unavailability of natural gas. Often, the only desirable or economically feasible substitute fuels are those viscous stocks, residues and by-products obtained from petroleum processes and coke-ovens. Unfortunately, such substitute fuels can impair the stability and economy of operation of reactors. Various fuel pre-conditioning treatments, entailing extra apparatus and expense, are often required. Generally speaking, the refractory materials with which carbon black reactors are ordinarily lined have a shorter useful life when operating on such fuels than they would have if natural gas were employed. There is often severe erosion of the refractory lining, leading to definite impairment of the properties of the carbon black products produced therein. Coke deposits form within the reactor combustion chamber, leading to unstable operation. Ash deposited in the chamber from the burning fuel often frustrates proper firing of the reactor. Thus, there is a demand for improvements tending to reduce or eliminate the problems associated with burning these substitute fuels.

The principal object of this invention is to fulfill the above demand. In particular, it is an object of this invention to provide a new and improved fuel injection apparatus combination. More particularly, it is an object to provide a novel fuel injection ring for feeding light, medium and heavy hydrocarbon fuels into a reactor in a manner which provides long trouble-free operation. Still another object is to provide a reactor with a novel fuel injection apparatus for atomizing fuel oil outside the reactor, and for uniformly dispersing the fuel in a stream of combustion-supporting gas entering the reactor through a generally annular combustion supporting gas inlet. Still another object is to provide a reactor with a novel fuel injection system for delivering an atomizing medium and a heavy residual fuel or fuel oil separately to the interior of a reactor and for atomizing the fuel substantially simultaneous with its injection into a stream of combustion supporting gas which enters the interior of the reactor through a generally annular combustion supporting gas inlet. These and other objects of the invention will become readily apparent upon consideration of the description which follows.

In accordance with the invention, a reactor selected from the types characterized above is equipped with a fuel injection ring at its combustion-supporting gas inlet. By "at" the inlet is meant that the ring is on, in, near or by the inlet, so that fuel discharged from the ring may pass without delay into combustion-supporting gas which is being, has been or is to be discharged from the inlet. Thus, for instance, the ring may be located either within or without the inlet. The ring, which may be of any convenient shape and dimensions, has within it a passage adapted to carry fuel. This passage may also be of any convenient shape and dimensions. Preferably, the passage is endless; that is, it extends all the way around the interior of the ring. One or more fuel supply conduits communicating with said passage extend to the exterior of the reactor for supplying the ring with fuel. The ring is provided with discharge means in communication with said passage and arranged around the exterior of the ring so as to distribute the fuel evenly as it is discharged.

At a point along the fuel flow path defined by said conduit, passage and discharge means, atomizing means are in communication or are operatively connected with said flow path for bringing the fuel together with atomizing medium and atomizing the fuel. The atomizing means may be directly or indirectly associated with any of the means defining the said flow path. For instance, the atomizing means can be the discharge means or may be included therein, or the atomizing means can be included in the conduit, be connected directly to the end of said conduit or be connected indirectly to the conduit via a branch conduit. Means of any appropriate type are provided for supplying the atomizing means with a suitable atomizing medium. The system may also be provided with means for preheating the fuel, or atomizing medium, or both, although this will, in many cases, be entirely unnecessary.

The invention may be embodied in various specific forms. For instance, the atomizing means may be located outside the reactor and there may be several conduits to carry atomized fuel to a single passage extending around the interior of the ring. On the other hand, the ring can have separate fuel and atomizing medium passages, supplied from and communicating with the exterior of the reactor by way of separate conduits, the discharge means arranged about the ring being connected to said separate passages and being adapted to or including means to atomize the fuel. Other embodiments will readily suggest themselves to persons skilled in the art. Accordingly, it is evident that the invention is a broad one, not to be regarded as unduly limited by the details of the exemplary embodiments described herein.

In the accompanying drawings, in which sectional figures are taken along section lines bearing corresponding numerals, and in which the same parts have the same numbers throughout:

FIGURE 1 is a partial sectional view of a carbon black reactor of a type to which the invention pertains;

FIGURE 2 is a sectional view of a portion of the FIGURE 1 reactor illustrating a first embodiment of the invention;

FIGURE 6 is a sectional view corresponding to FIGURE 2 but showing a second embodiment of the invention;

FIGURES 7 through 9 are enlarged sectional views of details of FIGURE 6;

Figure 3:
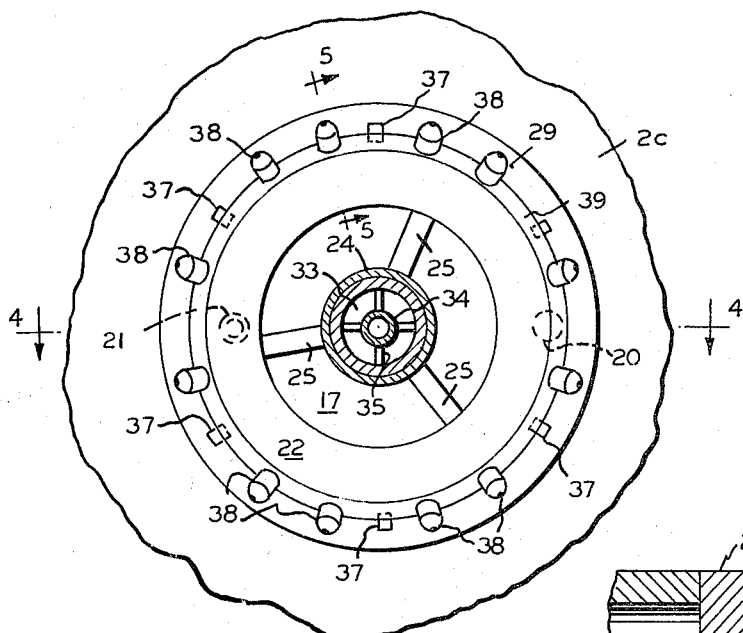
FIGURES 3 through 5 are enlarged sectional views of details of FIGURE 2.

Referring now to FIGURE 1 of the drawing, reference numeral 1 denotes a carbon black reactor having a generally tubular combustion chamber. The chamber is divided into a number of sub-chambers or zones of varying configuration. There is first or heating chamber 2, second or reaction chamber 3 and quench chamber 4.

Heating chamber 2 is of greater diameter than length and is defined by circumferential side wall 2a, upstream end wall 2c and downstream end wall 2b. Through an axial opening in end wall 2c, heating chamber 2 communicates with fuel injector assembly 7, which protrudes through said hole into the chamber. Through an axial opening in end wall 2b, the heating chamber communicates with the upstream end of reaction chamber 3. Reaction chamber 3 is of greater length than diameter and has a significantly smaller diameter than heating chamber 2. At the upstream end of reaction chamber 3 is a replaceable choke ring 8 with a cylindrical outer surface and center orifice 9 and perpendicular, planar front and rear faces. Its front face is flush with end wall 2b. The length, shape and placement of the ring 8 and its orifice 9 may be varied, according to the grade of carbon black to be produced. Quench zone 4 is an extension of reaction zone 3. It is provided with quench ports 5 for spraying a quench fluid into the said zone and with an outlet at its downstream end (not shown) for withdrawal of reaction products. The outlet is connected to cooling apparatus and separatory devices to remove carbon black particles from effluent gases. Each of the zones 2, 3 and 4 have a lining 10 of highly heat-resistant refractory brick, surrounded by lower grade cast refractory insulation 11 and an outer steel shell 12.

As can be seen by reference to FIGURES 1 through 3, injector assembly 7 includes large and small diameter tubular members 13 and 19, respectively. Tubular member 13 is connected to reactor shell 12 by cooperating flanges 14 and 15 on the tubular member and shell, respectively, the flanges also serving as retainers for relatively gas-tight packing 16. The larger tubular member has an open inner end 23. The opposite end of this tubular member is closed off by end plate 18, bearing packing glands 30, 31 and 32, through which various conduits and tubular member 19 gain entry to its interior. Tubular members 13 and 19 are both concentric with the axis of the heating chamber 2, the latter tubular member being longer than and extending through the packing gland 30 and open end 23 of the former. Tubular member 19 extends into heating chamber 2 and is supported near the open end of tubular member 13 by axially disposed sleeve 24, the latter being held in position by a plurality of spoke-like radial supports 25. These supports also help carry the weight of a deflector carried on the inner end of tubular member 19.

Deflector 26 is annular, has a refractory front face and body, and has a back of a metal such as stainless steel, which is characterized by a low coefficient of expansion relative to temperature. The back is secured to tubular member 19. There is a hole through the center of the deflector corresponding to and constituting a continuation of a passageway 33 within tubular member 19. This hole opens axially into heating chamber 2. Deflector 26 and tubular member 13 have substantially equal diameters. The deflector and open end 23 of tubular member 13 are perpendicular to the axis of chamber 2, and are axially spaced with respect to one another. The deflector is situated completely within heating chamber 2 and is spaced inwardly from end wall 2c and open end 23. Together with said open end and end wall 2c, deflector 26 defines a circumferential orifice 27 opening into and communicating radially with heating chamber 2. This orifice 27 is a kind of annular combustion-supporting gas inlet that is able to direct gas generally outwardly with respect to the chamber axis, the gas moving in a stream which somewhat resembles a disc or dish. There is a combustion-supporting gas supply pipe 28 outside the reactor, communicating with the interior of tubular member 13, the space between said tubular member and tubular member 19 defining a passageway 17 connecting the supply pipe to orifice 27.

Within passageway 33 in tubular member 19 and concentric therewith is feedstock supply conduit 34. It extends from outside the outer end of tubular member 19, where it may connect with a feedstock supply, to a point adjacent the inner end of said tubular member. Conduit 34 is held in position by a plurality of fin-like supports 35. At its inner end is any suitable feedstock discharge means, preferably a nozzle 36 having a conical spray pattern centered about the axis of chamber 2. Although orifice 27 and the outlet of nozzle 36 are not in the same vertical plane, it may be generally said that the orifice or combustion-supporting gas inlet generally surrounds the feedstock injection nozzle, since the latter is on the axis of heating and reaction chamber 2, while the former is spaced outwardly from said axis and extends around it.

This completes a description of one kind of reactor to which both embodiments of the invention are applicable. While this reactor is the one with which it is preferred to employ the invention, it is equally possible to employ the invention with other reactors falling within that class of reactors to which the invention pertains. Therefore, the above-described reactor should be regarded as illustrative and not as limiting the invention.

One preferred embodiment of the fuel injection ring assembly of this invention is clearly disclosed in FIGURES 2 through 5. The fuel injection ring, which in the present embodiment is slightly smaller in diameter than tubular member 13, is fixed at the combustion-supporting gas inlet, the ring being centered about tubular member 19. The fuel injection ring is held in place by a plurality of angularly spaced lugs 37 distributed about the surface of bevelled ring 29, which is secured to the open end of tubular member 13 flush with end wall 2c of heating chamber 2. The lugs 37 are of such size as to maintain fuel injection ring 22 in longitudinally spaced apart relationship with both bevelled ring 29 and the back of deflector 26. The aforesaid rings may be fabricated of forged iron or other suitable material(s). Their cross-sectional dimensions and configuration and diameters may be varied freely in accordance with the invention. Ring 29 may even be dispensed with altogether if some other means of mounting the ring 22 is adopted. It has been found advantageous to provide the fuel injection ring 22 with a conical, cylindrical or planar surface about which to distribute atomizing nozzles. In accordance with the present embodiment, said surface is a peripherally forwardly inclined conical surface 39 having a preferred angle of inclination forwardly from the radial of about 0° to about 45°. The preferred angle is from about 10° to about 30°. The inclination of the surface 39 results in a similar forward inclination of the nozzles secured thereto.

Figure 5:
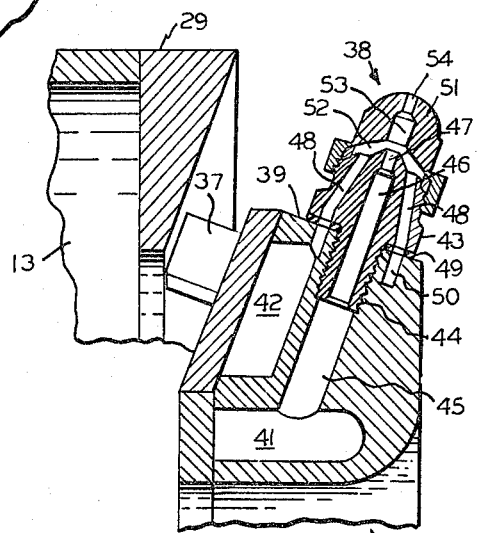
Figure 4:
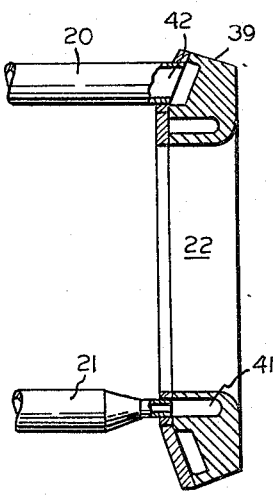

The fuel injection ring has within its interior separate passages 41 and 42 for fuel and atomizing medium, respectively. Passage 41 is connected to a supply of fuel outside the reactor via fuel conduit 21, which enters the reactor through packing gland 31, traverses passageway 17 and discharges into a suitable fluid-tight port in the back of ring 22 in communication with passage 41. Passage 42 is connected to a supply of atomizing medium outside the reactor via atomizing medium conduit 20, which enters the reactor through packing gland 32, traverses passageway 17, and discharges into a suitable gas-tight port in the back of ring 22 in communication with passage 42. See FIGURES 2 and 4. The passages 41 and 42 preferably extend continuously around the entire interior of the ring, and are free of internal projections and undue roughness. Considerable variation in the cross-sectional dimensions and placement of passages 41 and 42 within the cross section of the ring is possible. However, the arrangement shown in the drawings is preferred because it makes possible a particularly convenient mode of connecting atomizing nozzles with said passages. Thus, in accordance with the preferred manner of installing the nozzles, which is in no way intended to be limiting, the surface 39 of the ring is spot-faced, drilled and tapped at equal intervals about the ring. The resultant threaded holes 45, one of which is illustrated in FIGURE 5, are deep enough to provide communication with passage 41. Circular grooves 50, one of which is illustrated in FIGURE 5, are provided in surface 39 with the axes of the holes 45 as their centers. These grooves are of sufficient depth to provide communication with passage 42. For best results, placement of the holes 45 and grooves 50 directly in front of any of the lugs 37 should be avoided.

An atomizing nozzle is installed in each of the holes 45. A wide variety of atomizing nozzles is available for use in connection with the present embodiment. Therefore, while a preferred type of nozzle has been shown in the drawings, no undue limitation should be implied therefrom. The preferred type of nozzle, one of which is illustrated in FIGURE 5, is commercially available. Each includes a base or fuel nozzle portion 43 having a threaded axial extension 44, which can be screwed firmly into one of the threaded holes 45. Within each extension 44 is fuel passage 46 which extends up into the base portion 43 and terminates at its upper end in a passage 47 of reduced cross-section. Within the base portion 43, arranged in a generally circular pattern around oil passage 46, are a plurality of atomizing medium passages 48. They have discharge openings at the upper end of the base portion 43 surrounding passage 47. They communicate at their lower ends with circular groove 50. The gasket 49 which is placed between the base of the nozzle and surface 39 is suitably apertured to avoid blocking off the passages 48. Secured to the top of base portion 43 is an atomizing medium nozzle portion 51. The underside of said portion 51 is a concave conical surface which is raised above the upper surface of base portion 43, thus defining a chamber 52, into which passages 48 may discharge. Said chamber, in turn, discharges along with reduced diameter oil passage 47 into a mixing chamber 53. Chamber 53 has a discharge outlet 54 of reduced cross-section. A nozzle of the above-described type is readily adapted to bring together a fuel and an atomizing medium, both under pressure, and to produce a very finely divided mist of fuel droplets dispersed in the atomizing medium.

In a second emobidment, which is particularly well suited for somewhat lighter fuels, the means for atomizing the fuel can be located at some point other than the surface of the fuel injection ring and the ring can be simplified considerably, as disclosed in FIGURES 6 through 10. For the sake of convenient description, the second embodiment is described herein in connection with the same reactor as was the first embodiment, the reactor of FIGURE 1. However, like the first embodiment, the second embodiment is readily adaptable to other types of reactors within the class of reactors to which the invention pertains.

FIGURE 6 is similar to FIGURE 2 in various respects and clearly illustrates the various similarities and differences between the two embodiments described herein. As in the first embodiment, the reactor retains the fuel injector assembly 7 with its tubular member 13, open end 23, closed end 18, packing glands 30, 31 and 32, flanges 14 and 15, packing 16, supports 25 and sleeve 24. Again, there is the tubular member 19, with its deflector 26, passageway 33, conduit 34, supports 35 and nozzle 36, all of these parts bearing the same relationship to one another as in the previous embodiment. In this embodiment, however, the fuel injection ring 55 is substantially equal in diameter to tubular member 13. The ring is held at the circumferential orifice formed by the spacing between deflector 26 and tubular member 13 by means of angularly spaced supporting lugs 75 welded to the ring and the tubular member.

A plurality of conduits 56, 57, 58 and 59 (see FIGURE 8) are connected at angularly spaced intervals about the rear of ring 55. These conduits extend back through the passageway 17 and pass out of the reactor through the packing glands 31 and 32 and through two additional similar packing glands (not shown) provided in closed end 18. These conduits are provided for carrying atomized fuel mixture from a plurality of atomizers outside the reactor to fuel injection ring 55. One such atomizer is connected to each of the conduits, but only three of them are shown in FIGURE 6, because it is a sectional view. The three illustrated atomizers 60, 61 and 62 are connected to conduits 56, 59 and 58, respectively, the fourth atomizer being connected to conduit 57. All of the atomizers have fuel input ports connected to a common branched fuel conduit 64. All of the atomizers have atomizing medium input ports connected to a common branched atomizing conduit 65 through back-pressure indicating gauges 66, 67 and 68.

FIGURE 7 shows the details of the atomizer 60, it being understood that the details of the other atomizers are the same. The atomizer 60 is formed by the fitting together of the threaded members 69 and 70 which together define a venturi zone 73 wherein is an air nozzle 71 in axial communication with the venturi throat 72. Downstream of throat 72 the venturi zone expands and communicates with passage 74 in ring 55 via conduit 56. Venturi zone 73 is of circular cross-section and interconnects fuel conduit 64 with venturi throat 72 and passage 74. Thus atomized fuel may be delivered from the atomizer to the interior of the ring via conduits 56–60.

In accordance with the present embodiment, the ring is a hollow torus having an endless passage 74 therein. This is the preferred mode of practicing the present embodiment because of its ease of construction. However, the ring could be altered considerably in its cross-sectional configuration, dimensions and other details and still carry out its intended function. About its surface, in communication with passage 74, the ring has discharge means for discharging fuel into heating chamber 2. The discharge means need not have the capability of atomizing fuel, and therefore may merely be an opening or openings, a number of nozzles evenly distributed around the ring, or any other suitable means providing an opening or openings. For best results the discharge means should be directed generally along or into the flow path of the combustion-supporting gas, as determined by the position of the ring and generally annular combustion-supporting gas inlet. Thus, when the ring is within the inlet, as is the case in the present embodiment, the discharge means should be directed toward the inlet or, more particularly the orifice 27. On the other hand, if the ring is located outside the inlet, that is, within the heating chamber, the direction of discharge will depend upon whether the ring lies within the flow path of the combustion-supporting gas, or adjacent it. In the former situation, which is preferred, the direction of discharge will be generally along the flow path; in the latter it will be into the flow path. Some care should be taken to see that the discharge of fuel does not directly impinge upon the walls of the reactor chamber or of the combustion-supporting gas inlet. In the reactor of the present embodiment, the above considerations are satisfied by directing the discharge means generally towards orifice 27 at an angle of forward inclination ranging from about 0° to about 45° with respect to the radial. An angle of 10°–30° is preferred, and 20° has been adopted for purposes of this embodiment with its radially directed circumferential orifice. Of course, if the invention is practiced with a reactor having a combustion-supporting gas inlet which is oriented and directed differently than the circumferential orifice disclosed herein, the direction of the discharge means should be altered accordingly.

Figure 8:
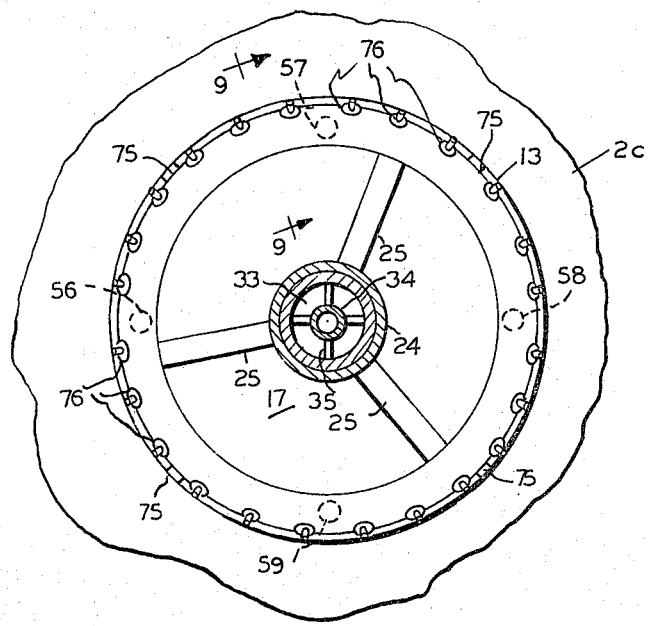
Figure 9:
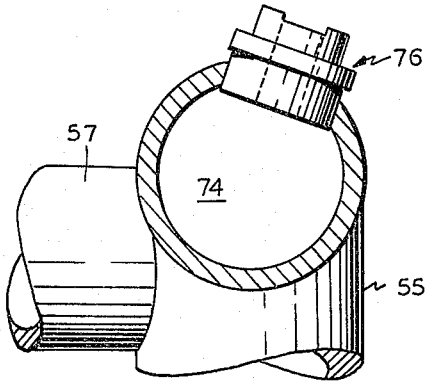

One of the many possible variations upon the discharge means, a plurality of small injection nozles 76 distributed substantially uniformly about the circumference of the ring, is shown in FIGURE 8. One such nozzle is shown in detail in FIGURE 9, which is a section taken along 9—9 of FIGURE 8. These nozzles are sufficiently close together and are designed to produce a spray pattern such that the atomized fuel mixture fans out upon exit from the nozzles in substantially contiguous sprays. In general, the greater the number of these nozzles the more uniform will be the distribution of the atomized fuel ejected therefrom. It follows from this also that a plurality of supply lines to the ring 55 are preferred, and for similar reasons. Four supply lines (56–60) have been found to provide a good distribution of the fuel around the ring, but this number may be increased or decreased as desired.

Figure 10:
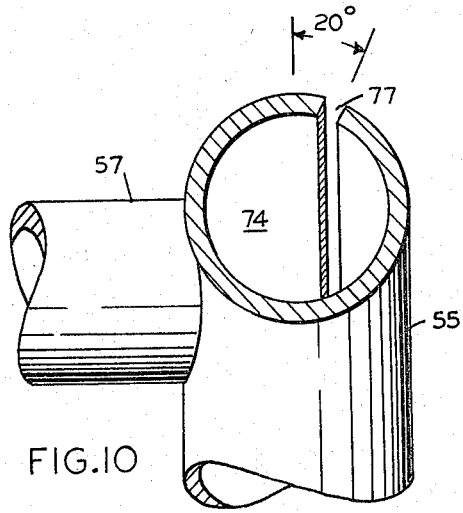
FIGURE 10 is a sectional view corresponding to FIGURE 9, but showing a modified form of discharge means associated with the said second embodiment of the invention.

The discharge means may also be a single slit 77 extending substantially completely around the circumference of the hollow ring 55 as indicated in FIGURE 10. This particular embodiment can provide especially long hours of trouble-free operation and can be fabricated quite conveniently and economically. It will be understood that the present invention contemplates also such obvious equivalents as a plurality of slit openings or substantially contiguous holes extending around the circumference of the ring.

According to the preferred method of operating the embodiments described herein, combustion-supporting gas is caused to flow continuously through supply conduit 28 into passageway 17. The gas may be propelled by any suitable blower. The combustion-supporting gas may be any gas, gases or vapors or mixtures thereof-bearing sufficient oxygen, chemically combined or uncombined, or both, to support combustion. Ordinarily, the preferred combustion-supporting gas is air. The combustion-supporting gas which enters passageway 17 departs therefrom through open end 23 of tubular member 13, passes in separated streams in front of and behind the fuel injection ring 22 or 55, discharges through circumferential orifice 27 and recombines into one dish- or disc-shaped stream.

Atomized fuel is discharged into the combustion-supporting gas prior to, during or immediately subsequent to the discharge of said gas from the circumferential orifice, depending on where the fuel injection ring is secured with respect to the inlet. In the first embodiment disclosed herein, atomizing medium is supplied under pressure to conduit 20, and flows through said conduit, through passageway 42, through groove 50, through the holes in gasket 49, through passageway 48, through chamber 52 and into chamber 53. Preferably, the pressure in the system is maintained sufficiently high so that the atomizing medium enters chamber 53 at high, preferably sonic velocity. The atomizing medium may be any gas, gases, vapor, vapors or mixture thereof, such as air or steam, which has no substantial deleterious effects on the product, apparatus, or process. Liquid fuel, or semi-liquid fuel which may have been heated to increase its liquidity, is supplied and conducted separately under pressure through conduit 21, passage 41, hole 45, passage 46 and passage 47 to the chamber 53, where the fuel and atomizing medium come together for the first time. There, violent turbulent mixing takes place, resulting in the formation and forcible ejection of a mist of fuel droplets into the combustion supporting gas through the outlet 54 of each of the nozzles 38.

The fuel injection system of the second embodiment also forcibly discharges a mist of oil droplets into the combustion-supporting gas. However, in that embodiment, atomizing medium is supplied to the several atomizers 60, 61, 62 through conduit 65 at a sufficient rate to pass through air nozzles 71 and enter the venturi throats 72 at high, preferably sonic, velocity. Fuel is supplied to the several atomizers through conduit 64, passes through their venturi zones 73 and enters venturi throats 72, where it mixes with and is atomized by the atomizing medium. The resultant fuel mist enters the conduits 56, 57, 58 and 59, passes through said conduits, enters passage 74 in ring 55 and is discharged therefrom through whatever discharge means is provided, such as nozzles 76 or slit 77. The discharged fuel mist turbulently mixes with and disperses in the combustion supporting gas flowing adjacent the ring 55.

The combustion-supporting gas which has been discharged from orifice 27, and the fuel mist which has been discharged into said gas via ring 22 or ring 55 flow generally radially outward into chamber 2. The mixture is ignited at the orifice or near it. The burning mixture and its products of combustion continue to flow rapidly outwardly from the axis of the heating zone 2 as a uniformly expanding disc- or dish-shaped stream towards the circumferential surface of the heating zone 2. The combusting mixture then follows a flow pattern as shown by the arrows in FIGURE 1, tending to flow parallel to the circumferential wall 2a and towards the end wall 2b of heating zone 2. The flow of gases is then directed radially inwardly towards orifice 9.

While the hydrocarbon fuel and combustion-supporting gas are being introduced into the reactor, the hydrocarbon feedstock is simultaneously introduced through nozzle 36 as a finely divided spray. Simultaneously, air or other gas is introduced axially around the feedstock spray through passageway 33 in a known manner. Though the injection of feedstock is axial, it will be understood that the hydrocarbon feed does preferably take the form of an expanding cone directed toward orifice 9. After injection the temperature of the feedstock is rapidly raised as it approaches orifice 9. At orifice 9 the feedstock is thoroughly mixed with and dispersed into the hot combustion gases resulting from the burning of the hydrocarbon fuel, thus dissociating the hydrocarbon feedstock to carbon black particles suspended in an intensely hot effluent gas stream. The resultant mixture of carbon black and combustion products passes through orifice 9 into the reaction zone 3 and then into quench zone 4 wherein the cracking of the feedstock is terminated as desired by quenching the mixture with water or other suitable cooling medium introduced through quench ports 5. The cooled reaction gas with entrained carbon black then exits the reactor through an outlet opening (not shown) for subsequent separation and collection of carbon black by means which form no part of this invention.

Care should be exercised to see that the fuel and various gases supplied to the reactor are supplied at relatively constant rates and proportions. Stable operating conditions are beneficial for many reasons. Various ratios of combustion-supporting gas, fuel and atomizing medium may be selected. It has been found possible to use from about 150 to about 500, and more preferably about 180 to about 460 cubic feet of air (standard conditions) per cubic foot of fuel in the atomized fuel mixture to be discharged from the fuel injection ring. Also, it has been found possible to use about 20 to about 100, and more preferably about 35 to about 80 cubic feet of air (standard conditions) as the amount of combustion supporting gas for burning each cubic foot of the atomized fuel mixture. Where other atomizing media and combustion-supporting gases are employed, these ratios will be varied in accordance with well-recognized chemical and physical principles.

An advantage of the invention is that it provides for the effective burning of a wide range of liquid fuels and even heavy reisdual fuels and asphaltic residues. Pursuant to this invention, liquid fuels are substantially completely atomized into small oil droplets and are burned quite completely. The residual ash normally resulting from the burning of such fuels is produced as very fine particles, so small that they are readily dispersed and swept from the reactor with the effluent gases. There is no significant amount of clogging of the fuel injection ports, slagging or deterioration of the combustion or heating chamber. Moreover, the fine ash particles do not significantly adversely affect the refractory, as by fusion, and there is no significant amount of erosion. Furthermore, in accordance with this invention the flames from the burner openings do not impinge directly upon the refractory but instead are swept along by strong gaseous currents so that significant coke deposits are not formed.

It will be apparent to those skilled in the art that the above embodiments are merely illustrative of the broad concepts of the present invention. Various modifications, such as alteration of the positions, shapes, materials and functions of various parts, and addition, elimination, separation or combining of various parts, can take place without departing from the spirit and scope of the invention. Applicants' claims shall be construed as covering such modifications.

We claim:

1. A furnace-type carbon black reactor having a generally tubular chamber including an enlarged combustion zone at the upstream end thereof, an axially-disposed feedstock inlet adapted to discharge a feedstock into said combustion zone, a combustion-supporting gas inlet annularly-disposed about said feedstock inlet and adapted to introduce a combustion-supporting gas into said combustion zone, and fuel introduction means leading from a source of liquid fuel and a source of atomizing gas to said combustion zone; including a distributing ring annularly-disposed about said feedstock inlet immediately adjacent said combustion-supporting gas inlet, having a plurality of discharge outlets disposed at spaced points about said ring adapted to discharge a generally-radial stream of atomized liquid fuel into the path of said introduced combustion-supporting gas, and fuel atomizer means in said fuel introduction means between said liquid fuel and atomizing gas supplies and said discharge outlets adapted to intimately mix liquid fuel and atomizing gas and produce an atomized liquid fuel comprising a finely-divided mist of liquid fuel in atomizing gas.

2. A furnace-type carbon black reactor in accordance with claim 1 wherein said fuel atomizer means is a plurality of fuel atomizers located in said ring immediately adjacent each of said discharge inlets.

3. A furnace-type carbon black reactor in accordance with claim 2 wherein said fuel introduction means includes at least one liquid fuel supply line leading from a source of liquid fuel outside said chamber to a first circumferential opening in said ring and at least one atomizing gas supply line leading from a source of atomizing gas outside said chamber to a separate second circumferential opening in said ring and said first and second circumferential openings are connected to each of said fuel atomizers.

4. A furnace-type carbon black reactor in accordance with claim 1 wherein said combustion-supporting gas inlet includes a circumferential orifice.

5. A furnace-type carbon black reactor in accordance with claim 1 wherein said combustion-supporting gas inlet includes a centrally-located passage through the central opening of said ring and a radially-disposed impingement disc mounted adjacent the end of said centrally located passage slightly downstream from said ring and against which said combustion supporting gas impinges and is directed radially outwardly in a generally disc-shaped pattern.

6. A furnace-type carbon black reactor in accordance with claim 5 wherein said stream of atomized fuel is discharged from said ring in a generally-conical pattern toward the downstream end of the combustion zone and into said disc-shaped stream of said combustion-supporting gas.

7. A furnace-type carbon black reactor in accordance with claim 6 wherein said stream of atomized liquid fuel is discharged at an angle between about 10° and 30° from a radial plane.

8. A furnace-type carbon black reactor in accordance with claim 5 wherein said ring is mounted on an annular disc in spaced relation toward the downstream end of said combustion zone to form a second passage for combustion-supporting gas between said ring and said disc and form a second generally-conical pattern of combustion-supporting gas toward the downstream end of said combustion zone.

9. A furnace-type carbon black reactor in accordance with claim 5 wherein said feedstock inlet passes through said impingement disc and terminates at the downstream side thereof.

10. A furnace-type carbon black reactor in accordance with claim 1 wherein said fuel introduction means includes at least one atomized, liquid fuel line leading to said ring, a liquid fuel supply line leading from a source of liquid fuel outside said chamber and an atomizing gas supply line leading from a source of atomizing gas outside said chamber, and said fuel atomizer means includes a fuel atomizer connecting each of said atomized, liquid fuel lines with said liquid fuel and atomizing gas supply lines.

11. A furnace-type carbon black reactor in accordance with claim 10 wherein said fuel atomizers are located outside said chamber.

12. A furnace-type carbon black reactor in accordance with claim 10 wherein said discharge outlets comprise at least one slit.

13. A furnace-type carbon black reactor in accordance with claim 10 wherein said combustion-supporting gas inlet includes a circumferential orifice.

14. A furnace-type carbon black reactor in accordance with claim 10 wherein said combustion-supporting gas inlet includes a centrally-located passage through the central opening of said ring and a radially-disposed impingement disc mounted adjacent the end of said centrally located passage slightly downstream from said ring and against which said combustion supporting gas impinges and is directed radially outwardly in a generally disc-shaped pattern.

15. A furnace-type carbon black reactor in accordance with claim 14 wherein said stream of atomized fuel is discharged from said ring in a generally-conical pattern toward the downstream end of the combustion zone and into said disc-shaped stream of said combustion-supporting gas.

16. A furnace-type carbon black reactor in accordance with claim 15 wherein said stream of atomized liquid fuel is discharged at an angle between about 10° and 30° from a radial plane.

17. A furnace-type carbon black reactor in accordance with claim 14 wherein said ring is mounted on an annular disc in spaced relation toward the downstream end of said combustion zone to form a second passage for combustion-supporting gas between said ring and said disc and form a second generally-conical pattern of combustion-supporting gas toward the downstream end of said combustion zone.

18. A furnace-type carbon black reactor in accordance with claim 14 wherein said feedstock inlet passes through said impingement disc and terminates at the downstream side thereof.

References Cited by the Examiner

UNITED STATES PATENTS

| | | | |
|---|---|---|---|
| 3,026,185 | 3/1962 | Takewell et al. | 23—259.5 |
| 3,057,688 | 10/1962 | Williams | 23—209.4 |
| 3,060,003 | 10/1962 | Williams | 23—295.5 X |
| 3,116,114 | 12/1963 | Gunnell | 23—295.5 X |

FOREIGN PATENTS 1,146,215  3/1963  Germany.

MORRIS O. WOLK, *Primary Examiner.*

J. H. TAYMAN, JR., *Examiner.*